L. C. TRENT.
AGITATING AND AERATING APPARATUS.
APPLICATION FILED MAR. 19, 1908.

905,025. Patented Nov. 24, 1908.

WITNESSES.

INVENTOR.
L. C. Trent

UNITED STATES PATENT OFFICE.

LAMARTINE C. TRENT, OF EAST AUBURN, CALIFORNIA.

AGITATING AND AERATING APPARATUS.

No. 905,025.   Specification of Letters Patent.   Patented Nov. 24, 1908.

Application filed March 19, 1908. Serial No. 421,969.

*To all whom it may concern:*

Be it known that I, LAMARTINE C. TRENT, a citizen of the United States, residing at East Auburn, in the county of Placer and State of California, have invented certain new and useful Improvements in Agitating and Aerating Apparatus, of which the following is a specification.

The present invention relates to an improved agitating, mixing and aerating apparatus more particularly designed for use in connection with the treatment of cyanid solution for the dissolving of the gold contained therein, although it is equally as well adapted for the working of any class of solutions requiring agitation and aeration.

To comprehend the invention reference should be had to the accompanying sheet of drawings, wherein—

Figure 1:
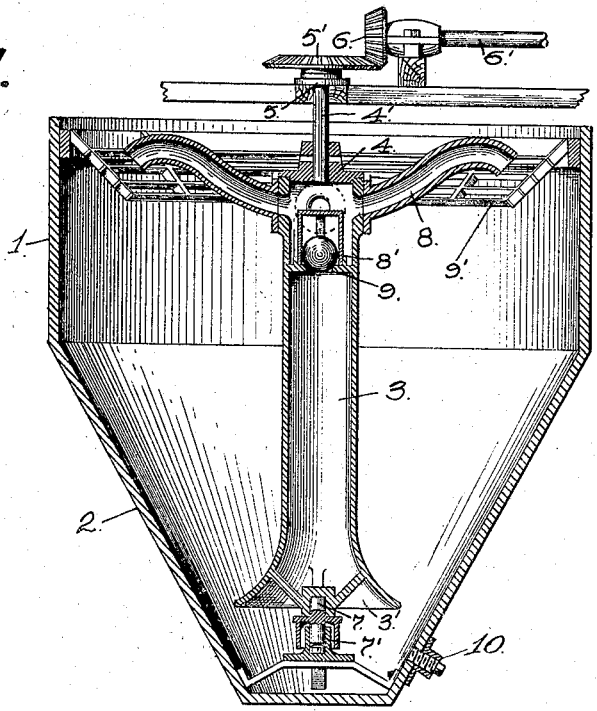
Figure 2:
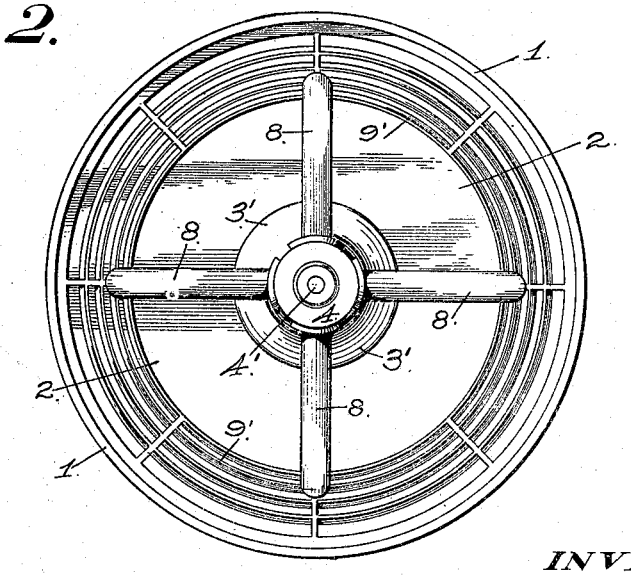

Figure 1 is a vertical sectional view of the apparatus. Fig. 2 is a plan view.

In the drawings the numeral 1 is used to designate any suitable form of a receiving tank, into which the material is delivered for treatment. The said tank is preferably of circular form, and provided with a tapering bottom portion 2. Within the tank 1 is mounted for rotation a vertically disposed tube 3, the lower end 3' of which is open for the intake of the solution contained within the tank 1, while its upper end is closed by means of a plug 4, or otherwise. From the closed upper end of the tube 3 extends the shaft 4', which shaft works within the bearing 5, and to the projecting end thereof is secured the gear 5', with which gear meshes the pinion 6, on the drive shaft 6'.

The centrally disposed tube 3 is supported from below by means of the bearing pin 7, which is stepped in the bearing 7', secured to the bottom of the receiving tank 1. Near its upper closed end, the centrally disposed tube 3 is provided with a series of outlets for the escape of the material or solution entering the lower open end thereof. In the present case these outlets are represented as a series of hollow radially disposed arms 8, through which the material drawn by suction into the tube 3 is discharged under centrifugal stress.

Within the upper portion of the tube 3, below the outlets thereof, is located a ball valve 8', which closes onto the seat 9, to prevent the solution or material flowing backward into the receiving tank 1, after having been raised above the seat 9.

The material discharged from the outlets or radially disposed arms 8 impacts onto a circular grating or wall 9', secured within the upper portion of the receiving tank 1. The material is discharged from the outlets 8 under pressure, and strikes against the grating or wall 9' with sufficient force to thoroughly break up and scatter the discharged streams, so as to permit of air intermingling therewith to aerate the same and give activity to the circulating solution, which falls from the grating or wall 9' back into the body of solution within the tank 1.

It will be understood that the tube 3 is rotated at a high rate of speed, being driven from the drive shaft 6' through the medium of the intermeshing gear and pinion 5' and 6.

For the treatment of the solution, the receiving tank 1 is filled approximately two thirds full with the solution as a single charge to be agitated, mixed and aerated, when rotation is imparted to the centrally disposed tube 3. Inasmuch as the tube is driven at a high rate of speed and rotates within the body of solution to be treated, the suction created by the rotation of the tube 3 will draw the solution into the lower open end thereof from the bottom portion of the receiving tank 1, the pressure of the inflowing solution raising or unseating the valve 8' and permitting the solution to flow toward the outlet radially disposed arms 8, from which the solution is discharged under centrifugal strains onto the grating or inclined wall 9' with sufficient force to break up or scatter the jets or discharged streams, which flow from the grating or inclined wall 9' into the receiving tank 1 to intermix with the circulating body of the solution within the receiving tank. The discharged streams as thus broken by impact onto the grating or wall 9', permit of air intermingling therewith to aerate the solution.

The solution is thus maintained in a constant condition of agitation throughout the working of the apparatus, the treatment being continued, where a cyanid solution is acted on, until all the gold contained therein is dissolved, when the working of the apparatus is discontinued, and the treated solution withdrawn from within the receiving tank. For this purpose there is shown an outlet pipe 10, which, when opened, permits of the solution being drawn off.

Having thus described the invention, what is claimed as new and desired to be protected by Letters Patent is—

1. An apparatus for agitating solutions, the same comprising a receiving tank or vessel, an open lower ended centrally disposed tube rotatably held therein, radially disposed outlets in the upper end portion of the said tube, and means for imparting rotation to the said tube to create a suction for drawing the solution into the lower open end thereof, and to force the same therefrom under pressure through the radial outlets.

2. An apparatus for agitating solutions, the same comprising a receiving tank or vessel for the liquid to be treated, an open lower ended centrally disposed tube rotatably held therein, radially disposed outlets in the upper portion of the tube, a valve interposed between said outlets and the lower open end of the tube, and means for imparting rotation to the said tube to create a suction for drawing the solution into the lower open end thereof, and to force the same therefrom under pressure through the radial outlets.

3. An apparatus for the described purpose, the same comprising a receiving tank or vessel for the solution to be treated, an open lower ended centrally disposed tube rotatably held therein, a series of outlet arms radially extended from the upper portion of the tube for the discharge of solution entering therein, an inclined grating or wall within the upper portion of the receiving tank or vessel onto which the solution discharged from the radial arms impinges, and means for imparting rotation to the central tube to create a suction for drawing the solution into the lower open end of the tube, and to force the same therefrom under pressure through the radially disposed outlet arms.

In testimony whereof I have signed my name to this specification in the presence of two subscribing witnesses.

LAMARTINE C. TRENT.

Witnesses:
N. A. ACKER,
D. B. RICHARDS.